2,819,946

PREPARATION OF TITANIUM TETRAIODIDE

Subramanya Ramamurthy, Banaras, India, assignor to Council of Scientific and Industrial Research, New Delhi, India, a corporation of India No Drawing. Application January 17, 1955
Serial No. 482,437

8 Claims. (Cl. 23—87)

This invention relates to a process for the preparation of titanium tetraiodide, which is important for the preparation of pure titanium metal.

The known methods for the preparation of titanium tetraiodide are:

(I) Passing iodine vapour over heated titanium metal, the reaction being, $Ti + 2I_2 = TiI_4$.

(II) Passing hydrogen iodide into warm titanium tetrachloride:

$$4HI + TiCl_4 = 4HCl + TiI_4$$

(III) Metathesis between titanium tetrachloride and phosphorus iodide:

$$3TiCl_4 + 4PI_3 = 4PCl_3 + TiI_4$$

(IV) Iodination of titanium carbide:

$$TiC + 2I_2 = C + TiI_4$$

and (V) Attacking a titanium rich aluminium alloy (e. g. Ti 70% and aluminium 30%) by a solution of iodine in carbon disulphide; the carbon disulphide is evaporated off; the mixture of titanium and aluminium iodides is treated with potassium iodide and heated to red heat; aluminium iodide forms a non-volatile complex compound and titanium tetraiodide distils off.

The principal object of this invention is the use of a new reaction for the preparation of titanium tetraiodide $(TiI_4)$.

The present invention consists in the preparation of titanium tetraiodide directly from titanium-di-oxide $(TiO_2)$ by reacting the latter with aluminium tri-iodide $AlI_3$). The reaction can be presented by the following equation:

$$4AlI_3 + 3TiO_2 = 3TiI_4 + 2Al_2O_3 \quad (A)$$

The aluminium iodide required for reaction (A) above need not be prepared separately prior to mixing with titanium-di-oxide. The reaction between aluminium and iodine as represented by the equation:

$$2Al + 3I_2 = 2AlI_3 \quad (B)$$

and the reaction between aluminium-tri-iodide and titanium-dioxide as represented by equation (A) above, are carried out simultaneously and in the same reaction vessel. This procedure is not only more economical than that of carrying out reactions (A) and (B) separately but also technically better for two reasons:

(1) Aluminum-tri-iodide is extremely hygroscopic, and the moisture which will be absorbed by it if prepared separately and then transferred and mixed with titanium-di-oxide, will hydrolyze part of the titanium tetraiodide and lower the yield of the latter compound; and (2) The reaction (B) above is highly exothermic and the heat thus produced can be effectively used if the two reactions (A) and (B) are allowed to occur simultaneously in the same vessel.

During the reaction between aluminium, iodine, and titanium dioxide, the lower iodides of titanium namely $TiI_2$ and $TiI_3$ may also be formed along with the tetraiodide $(TiI_4)$.

For carrying out the process according to my invention, stoichiometric proportions of dry titanium-di-oxide powder and iodine crystals are ground together to bring about intimate contact. This mixture is charged into a reaction vessel. The suitability of the reaction vessel is determined by its (I) chemical inertness to the substances involved namely iodine, iodides, and oxides of aluminum and titanium. For example, heat resisting glass is suitable whereas fused silica is not suitable because the oxides will attack it and (II) ability to withstand heating up to about 400° C. A stoichiometric quantity of dry aluminium powder is now charged into the same reaction vessel containing the titanium-di-oxide/iodine mixture. The whole charge is now well mixed.

Both the reactions (A) and (B) above are exothermic. As the initial mixture (of aluminium powder, iodine and titanium dioxide) ignites very easily, the reaction is started by gentle warming, say to about 100–125° C. After this start being given, the reaction is self-propagating. When the reactions are somewhat subdued stronger heating up to 400° C. is applied so that the titanium tetraiodide distils over into a condenser attached to the reaction vessel.

The duration of the initial heating is very short depending upon the charge weight—5 to 10 minutes should suffice. The duration of heating at a higher temperature (400° C.) will also be dependent on the charge weight. The tetraiodide has to be melted or distilled out of the reaction vessel and this may take about one hour if the charge weight is half a pound.

The heat developed by the formation of aluminium tri-iodide sometimes tends to make the reaction too vigorous to be properly controlled. This drawback can, however, be avoided if the process is carried out by passing the aluminium iodide in the vapour form over the hot titanium dioxide.

The process as described above may be modified by substituting for the aluminium tri-iodide a double salt of it, namely $KI.AlI_3$. The purpose of using this double iodide is to make the aluminium tri-iodide much less volatile, thus giving mainly titanium tetraiodide in the gaseous form. Thus the titanium tetraiodide escapes from the field of reaction, enabling a higher yield. Whereas, if the aluminium tri-iodide is used as such, being a liquid at the operating temperature, it dissolves the titanium tetraiodide formed. The latter unable to escape from the field of reaction, comes in contact with the (solid) titanium dioxide to get oxidized thus lowering the yield of titanium tetraiodide. If excess of aluminium tri-iodide is used to overcome this difficulty of $TiI_4$ getting oxidized, the product obtained will contain considerable $AlI_3$. These difficulties are overcome by converting the $AlI_3$ to $KI.AlI_3$. This form of the salt remains a solid even at red heat. After the reaction, the KI used remains as a non-volatile residue and can be recovered for re-use.

The following examples illustrate the invention:

Example 1

A mixture of 2.2 gms. of dry aluminium granules and 30.5 gms. of iodine crystals was placed in a dry 250 cc. "Pyrex" glass flask with an air condenser attached to it by a standard ground-glass joint. The air in this apparatus was swept out by a current of argon. A slow stream of this inert gas was maintained throughout the course of the experiment as the iodides of aluminium and titanium will be decomposed by atmospheric oxygen or moisture. The flask was then gently heated to initiate the combination of aluminium and iodine to form aluminium tri-iodide:

$$2Al + 3I_2 = 2AlI_3$$

As this reaction is strongly exothermic, heating is renewed only when it has subsided, so as to dissolve out any iodine that sublimed and condensed on the upper walls of the flask. This heating is continued till a clear, water-white liquid was obtained. Pure, dry titanium dioxide powder, 6.5 gms., was charged through the condenser, while maintaining the argon gas stream. The flask was heated strongly at this stage. The white aluminium tri-iodide and the white titanium dioxide reacted forming the reddish brown titanium tetraiodide. This strong heating was continued for about 5 minutes, and then allowed to cool off.

The cold mass was extracted with carbon di-sulphide, and after filtering off the insoluble residues (presumably alumina and lower oxides of titanium) the solution was analysed and found to contain 8 gms. of titanium tetraiodide.

Example 2

In another experiment similar to Example 1 above, 4.5 gms. of aluminium, 61 gms. of iodine and 13 gms. of titanium dioxide were used and about 18 gms. of titanium tetraiodide were obtained.

To recover the titanium tetraiodide from the other products of the reaction, it is not necessary to use carbon di-sulphide. Titanium tetraiodide is a volatile substance, and it can be vacuum-distilled, leaving the non-volatiles behind.

Example 3

7 gms. of iodine crystals, and 1 gm. of dry titanium dioxide powder were mixed intimately and placed inside a dry 250 cc. glass flask. 2 gms. of dry aluminium powder were then charged into the flask. A glass condenser was connected to the flask and the air in the apparatus swept out with argon. The reaction was initiated by gently heating the flask. A vigorous reaction ensued, throwing reddish brown vapours (characteristic of titanium tetraiodide) into the condenser. After the vigour of the reaction had subsided, the flask was heated to drive out as much of the reddish vapours into the condenser as possible. The condensate was extracted with alcohol. The alcohol solution was clear and brownish-red in colour. Analysis showed that titanium tetraiodide was present.

Example 4

The apparatus consists of a Pyrex glass tube (1 cm. dia., and 60 cms. long) to one end of which was sealed a Y-piece. To one arm of the Y was attached a sample bulb, while the other arm was connected to a long air-condenser.

At the center of the long tube was placed about 2 gms. of titanium dioxide. 2 gms. of aluminium granules and about 6 gms. of iodine were also placed but as separate masses. The titanium dioxide charge was kept at about 500° C., while the aluminium was kept at about 350° C. A current of argon was sent through. The iodine sublimed and reacted with the hot aluminium forming $AlI_3$. Since aluminium tri-iodide is a volatile substance (boiling point = 360° C.) its vapours were also carried over hot $TiO_2$ by the argon stream. A reddish liquid was found to collect in the sample bulb, which on analysis showed presence of titanium tetraiodide.

Example 5

3.3 gms. of iodine crystals and 0.3 gms. of dry aluminium granules were charged into a 100 cc. Pyrex glass flask, provided with two necks. To one neck was fixed a glass air-condenser, and to the other neck, a gas inlet tube. After sweeping out the air in the apparatus by a current of argon, the flask was heated. A vigorous reaction ensued with the formation of aluminium tri-iodide. Through the air-condenser 1.45 gms. of dry potassium iodide powder was charged and heating continued. This brought about the formation of $KI.AlI_3$. Now, 0.5 gm. of dry $TiO_2$ is charged through the air-condenser. The flask is then strongly heated, about 500° C. Reddish brown vapours, characteristic of $TiI_4$, were found to be given off and these condensed in the air condenser and the upper walls of the flask. The products were extracted with carbon disulphide, and filtered. A clear reddish solution was obtained as the filtrate, which on analysis showed the presence of 2 gms. of $TiI_4$.

Instead of using carbon disulphide for extracting the $TiI_4$, it can be easily distilled and obtained as a condensate by using a vacuum.

What I claim is:

1. A process for the preparation of titanium tetraiodide which consists in reacting in an inert atmosphere of argon a mixture of titanium dioxide ($TiO_2$) and a salt from the group consisting of aluminum tri-iodide ($AlI_3$) and the double salt of aluminum tri-iodide with potassium iodide ($KIAlI_3$) in the proportions of 3 moles of titanium dioxide to 4 moles of the aluminum tri-iodide salt, with a temperature range between 100° and 500° C., and separation of the resulting titanium tetra-iodide.

2. A process as claimed in claim 1 wherein the aluminium iodide is passed in the vapour form over titanium dioxide at 500° C.

3. A process according to claim 1 in which the aluminium iodide is used as a double salt of it, namely, $KI.AlI_3$.

4. A process for the preparation of titanium tetraiodide which consists of heating to 400° C. a mixture of $TiO_2$ and $KIAlI_3$ in molar proportions of 3:4 in an inert atmosphere of argon and separation of the resulting titanium tetra-iodide.

5. A process as claimed in claim 4, in which the reaction is carried out in an inert atmosphere of argon.

6. A process as claimed in claim 4, in which the reaction is carried out at a reduced pressure of 30 mm. Hg.'.

7. A process as claimed in claim 4, in which the titanium tetra-iodide is separated by distillation.

8. A process for the preparation of titanium tetraiodide which consists of heating, in an inert atmosphere of argon, a mixture of aluminium powder, iodine and titanium dioxide in the molar proportions of 4:6:3 respectively, gently to 125° C. then strongly up to a temperature of 400° C. and separation of the resulting titanium tetra-iodide by distillation.

No references cited.